US011854530B1

(12) United States Patent
Yoon et al.

(10) Patent No.: US 11,854,530 B1
(45) Date of Patent: Dec. 26, 2023

(54) AUTOMATED CONTENT FEEDBACK GENERATION SYSTEM FOR NON-NATIVE SPONTANEOUS SPEECH

(71) Applicant: Educational Testing Service, Princeton, NJ (US)

(72) Inventors: Su-Youn Yoon, Tokyo (JP); Ching-Ni Hsieh, Lawrenceville, NJ (US); Klaus Zechner, Princeton, NJ (US); Matthew Mulholland, Ewing, NJ (US); Yuan Wang, Plainsboro, NJ (US)

(73) Assignee: Educational Testing Service, Princeton, NJ (US)

( * ) Notice: Subject to any disclaimer, the term of this patent is extended or adjusted under 35 U.S.C. 154(b) by 297 days.

(21) Appl. No.: 16/857,305

(22) Filed: Apr. 24, 2020

Related U.S. Application Data

(60) Provisional application No. 62/838,428, filed on Apr. 25, 2019.

(51) Int. Cl.
G10L 15/06 (2013.01)
G10L 15/16 (2006.01)
(Continued)

(52) U.S. Cl.
CPC ............ G10L 15/063 (2013.01); G06F 3/048 (2013.01); G06N 3/08 (2013.01); G06N 20/10 (2019.01);
(Continued)

(58) Field of Classification Search
CPC ... G10L 15/063; G10L 15/16; G10L 15/1822; G10L 15/187; G10L 17/12; G06F 3/048; G06N 3/08; G06N 20/10
See application file for complete search history.

(56) References Cited

U.S. PATENT DOCUMENTS

| 8,650,031 B1 * | 2/2014 | Mamou | G06F 16/00 |
| | | | 707/738 |
| 2009/0258333 A1 * | 10/2009 | Yu | G09B 19/06 |
| | | | 434/157 |

(Continued)

OTHER PUBLICATIONS

Y. Qian, R. Ubale, M. Mulholland, K. Evanini and X. Wang, "A Prompt-Aware Neural Network Approach to Content-Based Scoring of Non-Native Spontaneous Speech," 2018 IEEE Spoken Language Technology Workshop (SLT), 2018, pp. 979-986, doi: 10.1109/SLT. 2018.8639697. (Year: 2018).*

(Continued)

*Primary Examiner* — Jialong He
*Assistant Examiner* — Keisha Y. Castillo-Torres
(74) *Attorney, Agent, or Firm* — Jones Day

(57) ABSTRACT

An electronic audio file is received that comprises spontaneous speech responsive to a prompt in a non-native language of a speaker. Thereafter, the electronic audio file is parsed into a plurality of spoken words. The spoken words are then normalized to remove stop words and disfluencies. At least one trained content scoring model is then used to determine an absence of pre-defined key points associated with the prompt in the normalized spoken words. A list of the determined absent key points can be generated. This list can then be displayed/caused to be displayed in a graphical user interface along with feedback to improve content completeness. Related apparatus, systems, techniques and articles are also described.

18 Claims, 4 Drawing Sheets

(51) Int. Cl.
| | |
|---|---|
| *G10L 15/18* | (2013.01) |
| *G06F 3/048* | (2013.01) |
| *G10L 17/12* | (2013.01) |
| *G06N 3/08* | (2023.01) |
| *G06N 20/10* | (2019.01) |
| *G10L 15/187* | (2013.01) |

(52) U.S. Cl.
CPC ............ *G10L 15/16* (2013.01); *G10L 15/187* (2013.01); *G10L 15/1822* (2013.01); *G10L 17/12* (2013.01)

(56) References Cited

U.S. PATENT DOCUMENTS

| | | | | |
|---|---|---|---|---|
| 2015/0243181 | A1* | 8/2015 | Somasundaran | G09B 7/02 434/167 |
| 2015/0248898 | A1* | 9/2015 | Loukina | G09B 19/04 704/239 |
| 2018/0373974 | A1* | 12/2018 | Ahn | G06Q 10/10 |
| 2019/0180639 | A1* | 6/2019 | Dechu | G06N 3/006 |
| 2019/0182382 | A1* | 6/2019 | Mazza | H04L 51/02 |
| 2020/0026759 | A1* | 1/2020 | Schwarm | G06F 16/313 |

OTHER PUBLICATIONS

Yoon, Su-Youn, et al. "Word-embedding based content features for automated oral proficiency scoring." Proceedings of the third workshop on semantic deep learning. 2018. (Year: 2018).*

Brown, Annie, Iwashita, Noriko, McNamara, Tim; An Examination of Rater Orientations and Test-Taker Performance on English-for-Academic-Purposes Speaking Tasks; Educational Testing Service, Monograph Series MS-29; Apr. 2005.

Chen, Lei, Tao, Jidong, Ghaffarzadegan, Shabnam, Qian, Yao; End-to-End Neural Network Based Automated Speech Scoring; IEEE International Conference on Acoustics, Speech and Signal Processing; Apr. 2018.

Cheng, Jian, D'Antilio, Yuan Zhao, Chen, Xin, Bernstein, Jared; Automatic Assessment of the Speech of Young English Learners; Proceedings of the 9th Workshop on Innovative Use of NLP for Building Educational Applications; Baltimore, MD; pp. 12-21; Jun. 2014.

Cotos, Elena; Potential of Automated Writing Evaluation Feedback; Calico Journal, 28(2); pp. 420-459; 2011.

Eskenazi, Maxine, Kennedy, Angela, Ketchum, Carlton, Olszewski, Robert, Pelton, Garrett; The Native Accent Pronunciation Tutor: Measuring Success in the Real World; Workshop on Speech and Language Technology in Education; 2007.

Franco, Horacio, Bratt, Harry, Rossier, Romain, Gade, Venkata Rao, Shriberg, Elizabeth, Abrash, Victor, Precoda, Kristin; EduSpeak: A Speech Recognition and Pronunciation Scoring Toolkit for Computer-Aided Language Learning Applications; Language Testing, 27(3); pp. 401-418; 2010.

Frost, Kellie, Elder, Catherine, Wigglesworth, Gillian; Investigating the Validity of an Integrated Listening—Speaking Task: A Discourse-Based Analysis of Test Takers' Oral Performances; Language Testing, 29(3); pp. 345-369; Nov. 2011.

Gu, Lin, Davis, Larry, Tao, Jidong, Zechner, Klaus; Using Spoken Language Technology for Generating Feedback to Prepare for the TOEFL-iBT Test: A User Perception Study; Assessment in Education: Principles, Policy & Practice; DOI: 10.1080/0969594X.2020.1735995; 2020.

Heilman, Michael, Madnani, Nitin; ETS: Domain Adaptation and Stacking for Short Answer Scoring; Second Joint Conference on Lexical and Computational Semantics, vol. 2: Seventh International Workshop on Semantic Evaluation; Atlanta, GA; pp. 275-279; Jun. 2013.

Kim, Sun, Wilbur, W. John, Lu, Zhiyong; Bridging the Gap: a Semantic Similarity Measure Between Queries and Documents; arXiv:1608.01972; 2016.

Kusner, Matt, Sun, Yu, Kolkin, Nicholas, Weinberger, Killian; From Word Embeddings to Document Distances; Proceedings of the 32nd International Conference on Machine Learning, vol. 37 of Proceedings of Machine Learning Research; pp. 957-966; 2015.

Loukina Anastassia, Cahill, Aoife; Automated Scoring Across Different Modalities; Proceedings of the 11th Workshop on Innovative Use of NLP for Building Educational Applications; San Diego, CA; pp. 130-135; Jun. 2016.

Yster, Roy, Saito, Kazuya, Sato, Masatoshi; Oral Corrective Feedback in Second Language Classrooms; Language Teaching, 46(1); pp. 1-40; 2013.

Mikolov, Tomas, Sutskever, Ilya, Chen, Kai, Corrado, Greg, Dean, Jeffrey; Distributed Representations of Words and Phrases and Their Compositionality; Advances in Neural Information Processing Systems; pp. 3111-3119; 2013.

Pedregosa, Fabian, Varoquaux, Gael, Gramfort, Alexandre, Michel, Vincent, Thirion, Bertrand, Grisel, Olivier, Blondel, Mathieu, Prettenhofer, Peter, Weiss, Ron, Dubourg, Vincent, Vanderplas, Jake, Passos, Alexandre, Cournapeau, David, Brucher, Matthieu, Perrot, Matthieu, Duchesnay, Edouard; Scikit-learn: Machine Learning in Python; Journal of Machine Learning Research, 12; pp. 2825-2830; 2011.

Povey, Daniel, Ghoshal, Arab, Boulianne, Gilles, Burget, Lukas, Glembek, Ondrej, Goel, Nagendra, Hannemann, Mirko, Motlicek, Petr, Qian, Yanmin, Schwarz, Petr, Silovsky, Jan, Stemmer, Georg, Vesely, Karel; The Kaldi Speech Recognition Toolkit; Proceedings of the ASRU Workshop; 2011.

Qian, Yao, Ubale, Rutuja, Mulholland, Matthew, Evanini, Keelan, Wang, Xinhao; A Prompt-Aware Neural Network Approach to Content-Based Scoring of Non-Native Spontaneous Speech; Proceedings of the 2018 Workshop on Spoken Language Technology; pp. 979-986; Dec. 2018.

Qian, Yao, Wang, Xinhao, Evanini, Keelan, Suendermann-Oeft, David; Self-Adaptive DNN for Improving Spoken Language Proficiency Assessment; INTERSPEECH; San Francisco, CA; pp. 3122-3126; Sep. 2016.

Rehurek, Radim, Sojka, Petr; Software Framework for Topic Modelling With Large Corpora; Proceedings of the REC Workshop on New Challenges for NLP Framework; pp. 45-50; May 2010.

Rei, Marek, Cummins, Ronan; Sentence Similarity Measures for Fine-Grained Estimation of Topical Relevance in Learner Essays; Proceedings of the 11th Workshop on Innovative Use of NLP for Building Educational Applications; San Diego, CA; pp. 283-288; Jun. 2016.

Xi, Xiaoming; Automated Scoring and Feedback Systems: Where Are We and Where Are We Heading?; Language Testing, 27(3); pp. 291-300; 2010.

Xie, Shasha, Evanini, Keelan, Zechner, Klaus; Exploring Content Features for Automated Speech Scoring; Conference of the North American Chapter of the Association for Computational Linguistics: Human Technologies; pp. 103-111; 2012.

Yoon, Su-Youn, Bhat, Suma; A Comparison of Grammatical Proficiency Measures in the Automated Assessment of Spontaneous Speech; Speech Communication, 99; pp. 221-230; May 2018.

* cited by examiner

Reading Material

University administrators announced yesterday that the sculpture program, a division of the art department, will be eliminated. The main reason is a lack of student interest, reported one administrator. Although the number of art students has increased, fewer and fewer art majors are taking sculpture classes. Furthermore, the department's only sculpture professor is retiring this year. Given the art department's limited budget, the administrator explained, it just doesn't make sense to hire a new full-time professor to teach sculpture for only a handful of students.

Question
The woman expresses her opinion of the university's plan. State her opinion and explain the reasons she gives for holding that opinion.

Key Point 1: The university announced that they would eliminate the sculpture program.
Key point 2: The administrator explained that the main reason is because of a lack of student interest.
Key point 3: The second reason is that the sculpture professor is retiring and the department has limited budget to hire a new professor.

FIG. 1

Key Point
- original: "Students use the books for papers and need to refer to them over a longer period of time."
- after normalization: "students use books papers need refer longer period time"

Example 1: "... you actually need it for a long amount of time mostly research assignments because you need the reference from the books ..."

Example 2: "the student writing a paper or something so he will be will need to go back to the book to do it his or hers research for a long time"

FIG. 2

AUTOMATED CONTENT FEEDBACK GENERATION SYSTEM FOR NON-NATIVE SPONTANEOUS SPEECH

RELATED APPLICATION

The current application claims priority to U.S. Pat. App. Ser. No. 62/838,428 entitled: "Automated Content Feedback Generation System for Non-Native Spontaneous Speech" filed on Apr. 25, 2019, the contents of which are hereby fully incorporated by reference.

TECHNICAL FIELD

The subject matter described herein relates to enhanced techniques for providing feedback to spontaneous speech of a user in a non-native language.

BACKGROUND

Providing feedback on content aspects of speech can help language learners discern the quality of their speech performance beyond linguistic dimensions such as fluency or grammar. This type of feedback is particularly relevant and crucial when considering integrated task performance, because the ability to accurately and adequately recreate the source materials is an essential language skill required in real-world academic or workplace contexts.

SUMMARY

In a first aspect, an electronic audio file is received that comprises spontaneous speech responsive to a prompt in a non-native language of a speaker. Thereafter, the electronic audio file is parsed into a plurality of spoken words. The spoken words are then normalized to remove stop words and disfluencies. At least one trained content scoring model is then used to determine an absence of pre-defined key points associated with the prompt in the normalized spoken words. A list of the determined absent key points can be generated. This list can then be displayed/caused to be displayed in a graphical user interface along with feedback to improve content completeness.

The parsing can be performed by an automated speech recognition (ASR) system.

The normalized spoken words can be segmented into a sequence of word n-grams with overlaps between two consecutive n-grams. For each n-gram, a similarity can be calculated with each of the pre-defined key points.

The similarity can be calculated in a variety of manners including using a word-mover's distance measure, a weighted word embedding measure, and/or a query-document similarity measure. Response-level features can be generated by selecting minimum and maximum values obtained as part of the similarity calculation among all n-grams in the normalized spoken words.

A machine learning model can be trained for each key point based on at least a portion of the response-level features, wherein the trained machine learning models form part of the trained scoring content model. The trained machine learning models can take various forms including, but not limited to, random forest models.

The trained scoring content model can include a random forest model and/or a plurality of support vector regressors trained for each of the key points.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 1 is a diagram illustrating sample key points;

FIG. 2 is a diagram illustrating sample key point and responses;

DETAILED DESCRIPTION

Figure 3:
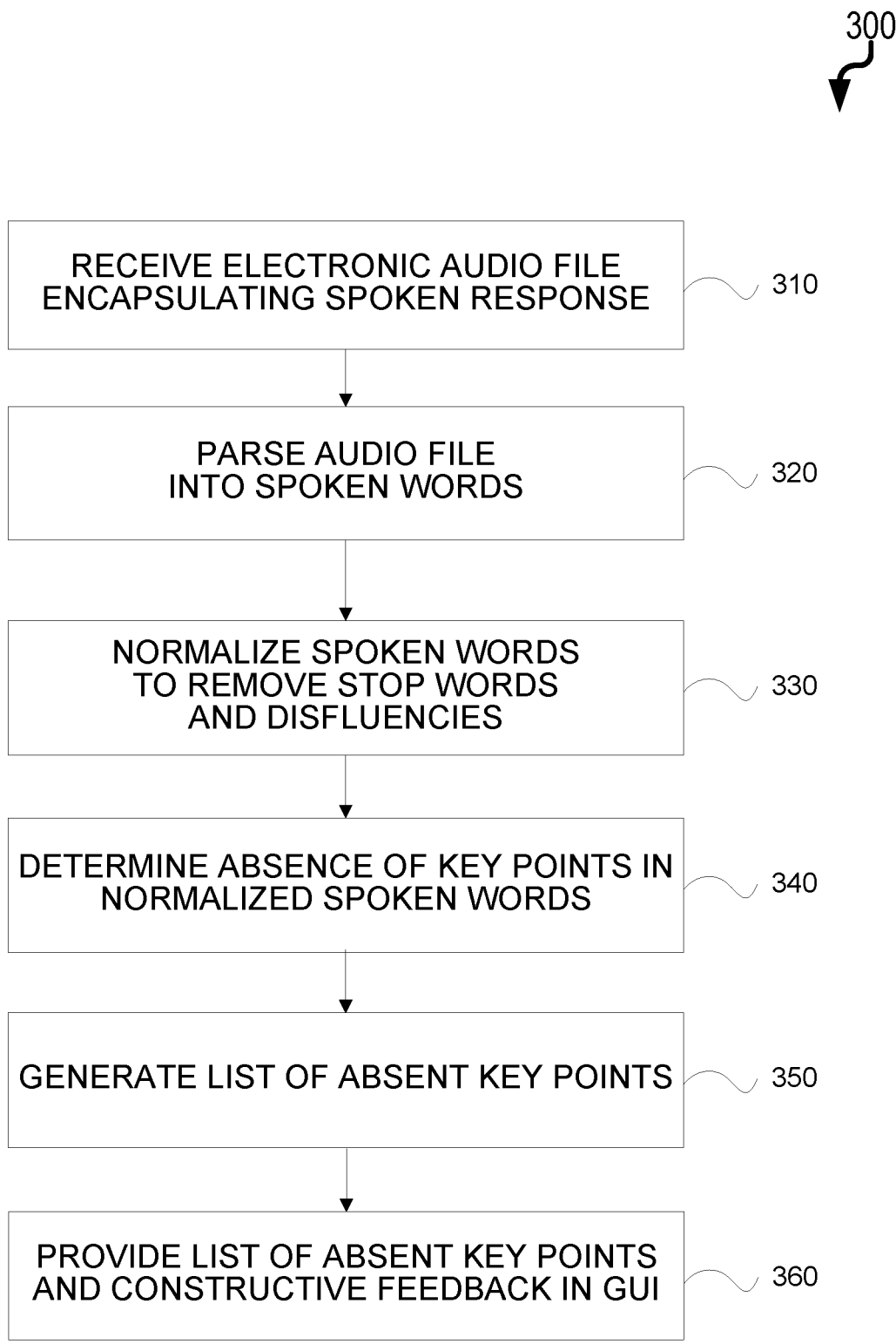
FIG. 3 is a process flow diagram illustrating automated content feedback generation for non-native spontaneous speech.

The current subject matter is directed to an automated algorithm/system to provide feedback about the specific content of non-native English speakers' spoken responses. The responses used to validate the current subject matter were spontaneous speech, elicited using integrated tasks where the language learners listened to and/or read passages and integrated the core content in their spoken responses. The models provided herein detect the absence of key points considered to be important in a spoken response to a particular test question, based on two different models: (a) a model using word-embedding based content features and (b) a short response scoring engine using traditional n-gram based features. Both models achieved a substantially improved performance over the majority baseline, and the combination of the two models achieved a significant further improvement. In particular, the models were robust to automated speech recognition (ASR) errors, and performance based on the ASR word hypotheses was comparable to that based on manual transcriptions. The accuracy and F-score of the best model for the questions included in the train set were 0.80 and 0.68, respectively. Finally, approaches to generating targeted feedback about the content of a language learner's response are provided herein that are based on automatically detected missing key points.

With the current subject matter, an automated algorithm provides feedback about the specific content of non-native English speakers' spoken responses. These algorithms are particularly helpful with situations in which language learners are preparing for a speaking test that is part of an assessment of English proficiency for academic purposes. The speaking test includes questions eliciting spontaneous speech. In particular, the items require language learners to read and/or listen to stimulus materials and then integrate and reproduce the key content from the source materials into their speaking performances (hereafter, integrated tasks). A speaker's performance is often evaluated by the content completeness and accuracy of the reproduced information, in addition to linguistic criteria including fluency, pronunciation, grammar, and vocabulary.

The current subject matter is informed by investigations into automated feedback through the dimension of content completeness. This content-aspect of speech performance refers to the degree to which an individual can process, select, integrate, and reproduce key source information into a subsequent oral response. The ability to reproduce complete content represents a critical aspect of integrated speaking task performance and is evaluated by the number of key points reproduced from the input materials. Key points are brief descriptions of content elements that test developers determine to be important in responses to a particular test question.

The content feedback algorithms provided herein can include trained automated models to detect the absence of key points that are the core content expected in correct answers. The output of these automated models can then be used to generate and convey feedback to the speaker so that he or she can improve her speaking proficiency.

Automated scoring of, or automated feedback generation about content in spontaneous speech is a challenging task for a variety of reasons. First, an automated speech recognition (ASR) system is used to generate an automated transcription of a spoken response as an input of the content feature generator. Errors at the ASR stage may negatively affect the content features such that they are noisy and distorted to some extent. Secondly, and more importantly, spontaneous speech, unlike read speech, is highly variable, and particular aspects of content can be expressed in many different ways by different speakers.

As noted above, the current subject matter provides an automated algorithm that generates feedback about content completeness for non-native speakers' spontaneous speech. Distinct from previous content scoring approaches that look at correctness of overall content by calculating similarity scores with high-scoring responses, the current subject first determines absence of individual key points. The absence of a key point signals an issue in the content completeness of a spoken response. Next, a list of missing key points can be presented with feedback about how to improve content completeness to the speakers. The current approach is advantageous in that it provides much more fine-grained and targeted feedback about the content of a response, as compared to conventional approaches.

In order to determine the absence of the key points, similarity scores between a spoken response and a key point were calculated using 1) a short response scoring engine and 2) word-embedding based features. The short response scoring engine requires a sizable amount of response data for each question to achieve a reliable performance. However, collecting question-specific data is a difficult and expensive task. Thus, the word-embedding features, that do not require any sample responses for each question for the feature training, have a strong advantage for practical systems. These two approaches were explored in two different conditions (questions in the training data vs. questions not in the training data) and, additionally, the impact of a question-specific training dataset was analyzed.

The training dataset utilized herein comprises digital audio files derived from spoken responses to test questions in an English proficiency assessment. 395 non-native speakers with a wide range of proficiency levels and from 52 different native language backgrounds produced a total of 1,185 responses. Each response consisted of around one minute of spontaneous speech. Four forms were used and each student responded to the questions on one form. Approximately 100 speakers' responses were collected per form.

When producing the integrated speaking tasks that were used for the current study, expert assessment developers first generated a list of key points to guide the creation of the reading and listening passages. These key points were provided to and used by human raters to evaluate content completeness of the spoken responses. Six key points were generated for each speaking task (henceforth, Key Point 1 to Key Point 6).

Each key point generally consisted of one complete sentence. Key Point 1 and 2 were about the mentioning of the concepts introduced in the source materials or the general opinions voiced (i.e., agree or disagree with a situation/change/proposal). Depending on the nature of the task questions, Key Point 3, 4, 5, and 6 involved brief definitions of the concepts, reasons provided for the opinions voiced, or detailed examples that illustrated the topics or concepts discussed. Key Point 1 and 2 were relatively straightforward whereas Key Point 3 to 6 contained more elaborated content.

FIG. 1 is a diagram 100 illustrating sample key points. Originally, a question, a reading material, and a listening material were one set, and there were three Key Points for the reading material and three Key Points for the listening material. With this example, only the question, the reading material, and three Key Points relevant to the reading material are illustrated.

The audio files were parsed to generate transcripts that were analyzed by three annotators who had backgrounds in linguistics and language education. In order to identify the Key Points that the students included or omitted in their responses, a binary scale, with 1 representing presence and 0 representing absence of each Key Point for the entire response, was used. The annotators paid attention to the ideas rather than the particular wording in Key Points and assigned a score of 1 (presence of Key Point) when students conveyed the Key Points in semantically legitimate variations, not necessarily using identical expressions. The three annotators went through multiple rounds of training and calibration in order to establish interrater reliability. In the initial rounds of training, when there were disagreements in the annotation, the three annotators resolved the problematic cases through discussions until exact agreements were reached. After that, each annotator independently annotated roughly even numbers of responses. The inter-rater agreement was relatively strong, and Cohen's kappa based on the 22% of double-scored responses was 0.72. However, there were large variations across different Key Points and kappa ranged from 0.61 to 0.85. The number of responses and distribution of Key Point score are presented in Table 1 below.

TABLE 1

Data size and Key Point (KP) distribution by proficiency levels.

| CEFR | # speakers | # responses | # ratings | Percentage of Key Point absence (score = 0) | | | | | | |
|------|-----------|-------------|-----------|-----|-----|-----|-----|-----|-----|-----|
|      |           |             |           | All | KP1 | KP2 | KP3 | KP4 | KP5 | KP6 |
| A2   | 95        | 285         | 1710      | 63  | 48  | 60  | 60  | 65  | 71  | 73  |
| B1   | 100       | 300         | 1800      | 43  | 32  | 39  | 38  | 49  | 48  | 51  |
| B2   | 100       | 300         | 1800      | 28  | 21  | 28  | 17  | 34  | 32  | 37  |
| C1   | 100       | 300         | 1800      | 19  | 22  | 20  | 11  | 19  | 15  | 26  |
| Total | 395      | 1185        | 7110      | 31  | 37  | 31  | 42  | 41  | 47  | 38  |

Two different approaches were used to detect the absence of a Key Point in a spoken response. First, classifiers using a set of features were trained that calculate similarity scores between a student's response and a Key Point. Next, automated models were trained for short response scoring.

Both Key Points and transcriptions of students' responses were normalized by removing stop words and disfluencies. After the normalization process, the length of the Key Points and responses were reduced into 60% and 40% of the original texts on average. After removing stop words, the average number of words in responses was 50.9 (based on the manual transcriptions) and 51.3 (based on the ASR hypotheses), respectively. The number of words in the Key Point after the normalization was 3.85 on average. In particular, Key Point 1 and Key Point 2 were shorter than the other Key Points; the average number of words for Key Point 1 was 2.08, while it was 5.58 for Key Point 6. For each Key Point, a word list was created containing all words (ALL) after the normalization. While some words (e.g., the topic or the concept name) appeared in multiple Key Points in the same question, it was found that some words were unique to a particular Key Point. Under the assumption that these unique words may be more important for detecting the absence of the specific Key Point, two additional word lists were created for each Key Point: a unique word list (Unique) and a shared word list (Shared) that contained words not in the unique list.

The response was segmented into a sequence of word n-grams with word overlaps (e.g., 5 words, etc.) between two consecutive n-grams. For each n-gram, the similarity with a particular Key Point can be calculated using the following three word-embedding based metrics:

Word Mover's Distance (WM-distance): This calculates a sum of the minimum distances between words in the two compared strings (a key-point and an n-gram of the response) where the distance between two words is the Euclidean distance between the two corresponding word vectors in the embedding space.

Weighted word embeddings: This calculates a cosine similarity score between a Key Point vector and a response n-gram vector. The Key Point vector is an average of the corresponding embedding vector with a tf-idf weight for each word in the Key Point. The n-gram vector was generated using the same process.

Query-document Similarity (QD): Responses are generally much longer than Key Points and WM-distance may assign unfairly low similarity scores to responses with extra information. For each word in the Key Point, this algorithm finds the word with the maximum similarity from a response n-gram, where the similarity score is the cosine similarity between two corresponding word embeddings. Finally, this metric uses a sum of all maximum similarity scores normalized by the Key Point length.

Next, response-level features were generated by selecting the minimum and the maximum values among all n-grams in a response. From 9 n-gram-based features (3 Key Point word lists*3 metrics), 18 values were selected for each response. Word embedding vectors such as those trained on the Google News corpus for all word-embedding based features, and WM-distance implementation in the gensim package for WM-distance calculation can be used.

Finally, a binary classifier was trained using response-level features with human Key Point scores as class labels. A total of 6 binary classifiers (one per Key Point) were trained using the random forest classifier algorithm in scikit-learn. Other types of classifiers can be used.

The automated scoring system as used herein (as a second method for detection of key point absences, elsewhere also referred to as "c-rater" or "short response content scoring engine") first generates sparse lexicalized features including word and character n-gram features and syntactic dependency features. Unlike the word-embedding features, an entire spoken response was used as an input for the feature generator. Finally, a Support Vector Regressor (sometimes referred to as a support vector machine) was trained with a radial basis function kernel for each Key Point, resulting in a total of 6 regression models. Each model was a generic model that was trained on all 12 questions.

The speakers were partitioned into two sets: train sets (49%), and test sets (51%). All responses from the same speaker belonged to one set, and thus the train sets and test sets did not share any speakers. The percentage of each form and speakers' proficiency levels were similar in each set. In order to investigate the impact of a question-specific training dataset, 4-fold cross-validation was conducted. As described below, the data was comprised of four forms (with three questions on each form). For each fold, three forms were used as the "seen form", and the remaining form was used as the "unseen form". The model was trained only on the seen form responses in the training partition. During evaluation, the model was evaluated on the seen form responses and the unseen form responses, separately.

Two different transcription methods were used: manual transcriptions by professional transcribers and automated transcriptions by an ASR system trained on non-native speakers' speech. A gender-independent acoustic model (AM) trained on 800 hours of spoken responses covering over 100 native languages across 8,900 speakers using the Kaldi toolkit was used. A DNNHMM model was adapted to test takers with fMLLR and i-vectors. The language model (LM) was a trigram model trained using the same dataset used for AM training. This ASR system achieved a Word Error Rate of 18.5% on 600 held-out responses. In order to compare the performance of the content features with c-rater, three models were trained: EMB (model based on word-embedding features), c-rater (model based on the c-rater engine), and CMB (combination of two models). For CMB, the probabilities generated by EMB and c-rater were averaged with 0.5 as a decision boundary. Finally, for each transcription mode, 18 binary classifiers were trained.

Table 2 below provides performance of the models on the seen forms where all questions in the test set appeared in the train set. The models were evaluated in terms of accuracy, F-score, and Cohen's kappa for detecting absence of the Key Points. Table 2 shows the average performance for 6 Key Points. In this study, the accuracy of the majority class baseline (classifying all responses as the Key Point presented) was 64% since the proportion of the responses without Key Point was 36% on average.

TABLE 2

Average performance of six Key Points on seen forms.

|  | Model | accuracy | F-score | κ |
|---|---|---|---|---|
| Manual | EMB | 0.77 | 0.65 | 0.47 |
|  | c-rater | 0.76 | 0.65 | 0.43 |
|  | CMB | 0.79 | 0.69 | 0.51 |
| ASR | EMB | 0.77 | 0.64 | 0.46 |
|  | c-rater | 0.75 | 0.63 | 0.42 |
|  | CMB | 0.80 | 0.68 | 0.51 |

For the experiment using the manual transcriptions, both the EMB and c-rater models achieved substantial improvement over the majority baseline. The performance of the EMB model was comparable to the c-rater model, and the combination of the two models resulted in further improvement. The accuracy and F-score of the CMB model were 0.79 and 0.69, respectively.

The results based on the ASR word hypotheses were comparable to those based on the manual transcriptions; the accuracy of the CMB model was 0.80 (0.79 for the manual transcription-based results) and F-score was 0.68 (0.69 for the manual transcription-based results). The EMB model achieved a slightly better performance than the c-rater model.

Table 3 provides the performance of the models on the unseen form where all questions in the test set did not appear in the train set.

TABLE 3

Average performance of six Key Points on unseen form.

|  | Model | accuracy | F-score | κ |
|---|---|---|---|---|
| Manual | EMB | 0.71 | 0.56 | 0.35 |
|  | c-rater | 0.61 | 0.56 | 0.23 |
|  | CMB | 0.71 | 0.61 | 0.37 |
| ASR | EMB | 0.71 | 0.54 | 0.33 |
|  | c-rater | 0.61 | 0.55 | 0.23 |
|  | CMB | 0.71 | 0.60 | 0.36 |

The performance of models for the unseen form was substantially lower than that for the seen forms. For the manual transcription-based results, the accuracy and the F-score of the CMB model were 0.71 and 0.61, respectively, approximately 0.07~0.08 lower than the results on the seen forms. Notably, the performance drop of the c-rater model was much larger than that of the EMB model, and the accuracy of the c-rater model was lower than the majority baseline. The performance of the EMB model was relatively better than the c-rater model, but it was still substantially lower than the performance on the seen forms. Finally, the combination of the two models resulted in a slight improvement in the F-score, but not in accuracy. The results based on the ASR word hypotheses were comparable to those based on the manual transcriptions.

The low performance of the c-rater models for the unseen form was somewhat expected. The models learned characteristic n-grams of specific Key Points from the training data. The Key Points in this study were largely different by questions, and these characteristic n-grams for one question may not be useful for other questions. The EMB models, however, did not directly use the n-gram patterns in the training data. Instead, they calculated the similarity scores between Key Points and responses using the word-embeddings based metrics and the train set was only used to determine the relationships between these features. This difference resulted in the performance difference between the two models on the unseen form.

In summary, the current subject matter was demonstrated to be robust to the ASR errors, and performance based on the ASR hypotheses was comparable to the manual-transcription-based performance when using a high performing ASR system. Feedback that relies on manual transcription may be a critical challenge, or not even a feasible option, for automated feedback systems used for large-scale learning programs. Therefore, the robustness to the ASR errors is an important advantage of the current techniques. In contrast, unseen questions had a strong negative impact on the models, and the performance of the best performing model (CMB model) decreased substantially when using the unseen questions. This may raise an important challenge to adding new questions in an operational learning program; in order to add new questions without lowering system performance, a sizable amount of responses may need to be annotated for each question.

The models utilized herein achieved promising performance in detecting missing Key Points from responses to the questions included in the training set. However, their performance was meaningfully lower than the performance of human raters; the κ between the algorithm and the human rater was 0.52, while the κ between two human raters was 0.72.

With the underlying studies, the raters did not penalize students who did not use the exact wordings in the Key Points; if a response contained a semantically comparable sentence to a Key Point, then the Key Point was considered to be present in the response. This approach may increase the difficulty of automated detection. In order to investigate how frequently students used expressions different from Key Points, a ratio of Key Point words that appeared in a response to all words in a particular Key Point (hereafter, Key Point ratio) was calculated. For instance, if a Key Point is comprised of 5 words and only 2 words appear in a response, then the Key Point ratio is 0.4, and it roughly suggests that 3 words in the Key Point are realized in different expressions. If the Key Point ratios are generally low for the Key Point-present responses, then it suggests that students frequently use expressions other than those in the Key Point. The Key Point ratio was calculated for each response using the manual transcription after the normalization process. Table 4 presents the average of the Key Point ratio.

TABLE 4

Average of the Key Point ratios for the
Key Point-present responses.

| Key Point type | Proportion of Key Point words in responses |
|---|---|
| Key Point 1 | 0.69 |
| Key Point 2 | 0.54 |
| Key Point 3 | 0.60 |
| Key Point 4 | 0.49 |
| Key Point 5 | 0.41 |
| Key Point 6 | 0.51 |

The average of the ratios for Key Point-present responses was 0.54. It ranged from 0.41 to 0.69. This suggests that around half of the words in the Key Points were realized in different wordings in these responses.

In order to understand the reason for the relatively low use of the exact wordings, a subset of Key Point-present responses with low Key Point ratio was selected and analyzed in terms of how the Key Points were expressed. Diagram 200 of FIG. 2 illustrates one Key Point and two sample responses. For the responses, only the segments that are relevant to the specific Key Point were provided.

Referring again to FIG. 2, example 1 contained 3 Key Point words ("need", "time", "books"), and "reference", "longer" were realized in their morphological variations ("refer", "long"). "papers", "students", "use", and "period" were replaced with contextually legitimate expressions (e.g., "research assignments" for "papers") or omitted. In example 2, the Key Point was realized in very different wordings. For instance, the core concepts, "use books for papers" and "need the reference", were expressed as "writing a paper" and "need to go back to the book", respectively. In particular, spontaneous non-native speech includes frequent grammatical or vocabulary usage errors, and this results in even wider variations in the realization of Key Points in their responses. The Key Point in this study was generally short and 38 Key Point (53%) contained less than 3 content word types. The short Key Point length may increase the difficulty of automated detection further, since the impact of replacing one Key Point word with different wordings is large.

The analysis further motivates use of the word embedding based features. In contrast to traditional lexical similarity features, which are limited to a reliance on exact word matching, the word embedding features utilized herein have the advantage of capturing topically relevant words that are not identical. The students' responses frequently included semantically legitimate expressions that were not the same words as those in Key Points, and this has resulted in improvements over systems using only traditional lexical similarity features.

The current techniques can also be used to generate targeted feedback based on the automated Key Point scores. There are several reasons that language learners may miss the key information from the source materials. When a student misses a key point, it may be an issue of reading and/or listening comprehension difficulty, or it could be an indication of lower speaking proficiency. When a language learner processes, selects, and synthesizes the key information from the source materials, the individual will need to recreate the key points using their linguistic knowledge and skills to generate the speech content. If a speaker does not possess the required linguistic knowledge and skills to produce a full response, a speaker may reproduce inaccurate or inadequate key points. In addition, previous research has suggested that reading and/or listening to source materials and reproducing them in an assessment context is a cognitively taxing task, especially for lower-proficiency students. This implies that some learners may not have the necessary linguistic working memory capacity to retain all the detailed information they read or heard that would enable them to reproduce the key information satisfactorily. Thus, providing feedback about missing key points can be helpful and revealing because it indicates the gaps in spoken summaries or responses.

A preliminary feedback algorithm can provide targeted feedback about the missing Key Points. Specifically, the feedback can be conveyed to the speaker in a graphical user interface and can be comprised of four parts: (a) source materials, (b) a language learner's response, (c) actionable instructions, and (d) sample responses.

The first part (source materials) can provide the listening passage and/or the reading passage of the question. The expert assessment developers annotate sentences relevant to each Key Point from the source materials, and the algorithm stores this information in advance. During feedback generation, the algorithm first automatically identifies Key Points missing from a response and displays the source materials relevant to the missing Key Points.

The second part (a language learner's response) can provide a function for the language learner to replay their own responses via the graphical user interface. Listening to his or her own responses while paying attention to the missing Key Points provided in the first part may help the test taker to understand the gaps in the response better. Optionally, the algorithm can provide the ASR-based transcriptions of the responses in the graphical user interface.

For the third part, the algorithm can first classify a response into a sub-group based on the automated Key Point scores and provide feedback prepared for the particular group. The Key Points in the underlying studies were designed in a highly structured way, and each Key Point was tied to specific skill areas (e.g., listening and reading) or tasks (e.g., define a concept, express his/her position about a proposal). Thus, the combination of the Key Point scores for each response may reveal specific weaknesses of the language learner. For instance, a high proportion of missing Key Points related to the listening passage may indicate that the language learner has a weakness with regard to listening or integrating information from listening into speaking. The algorithm can store actionable instructions prepared based on these language learners' characteristics for each group. In addition, when applying the feedback algorithm with an automated proficiency scoring system, a response can be classified into a sub-group based on an automatically detected proficiency level and the system then can provide feedback prepared for the particular proficiency level. The algorithm may provide different instructions for different proficiency levels. This approach enables us to provide more individualized, tailored feedback, where simpler and easier instructions are given to beginners while more complex and sophisticated instructions are provided for the intermediate or advanced learners.

Finally, the fourth part (samples) can present model responses from highly proficient language learners. The algorithm also provides explanations about how Key Points are expressed in these responses and what their strengths are. Optionally, the algorithm may provide some samples from low proficiency language learners with explanations about their weaknesses.

FIG. 3 is a process flow diagram 300 in which, at 310, an electronic audio file is received that includes spontaneous speech responsive to a prompt in a non-native language of a speaker. Thereafter, at 320, the electronic audio file is parsed into a plurality of spoken words. The spoken words are then normalized, at 330, to remove stop words and disfluencies. Using at least one trained content scoring model, at 340, an absence of pre-defined key points associated with the prompt in the normalized spoken words is determined. Based on this determination, at 350, a list of the determined absent key points is generated. A view is then, at 360, caused to be displayed in a graphical user interface that identifies the list of absent key points and which provides feedback to improve content completeness for the speaker.

Figure 4:
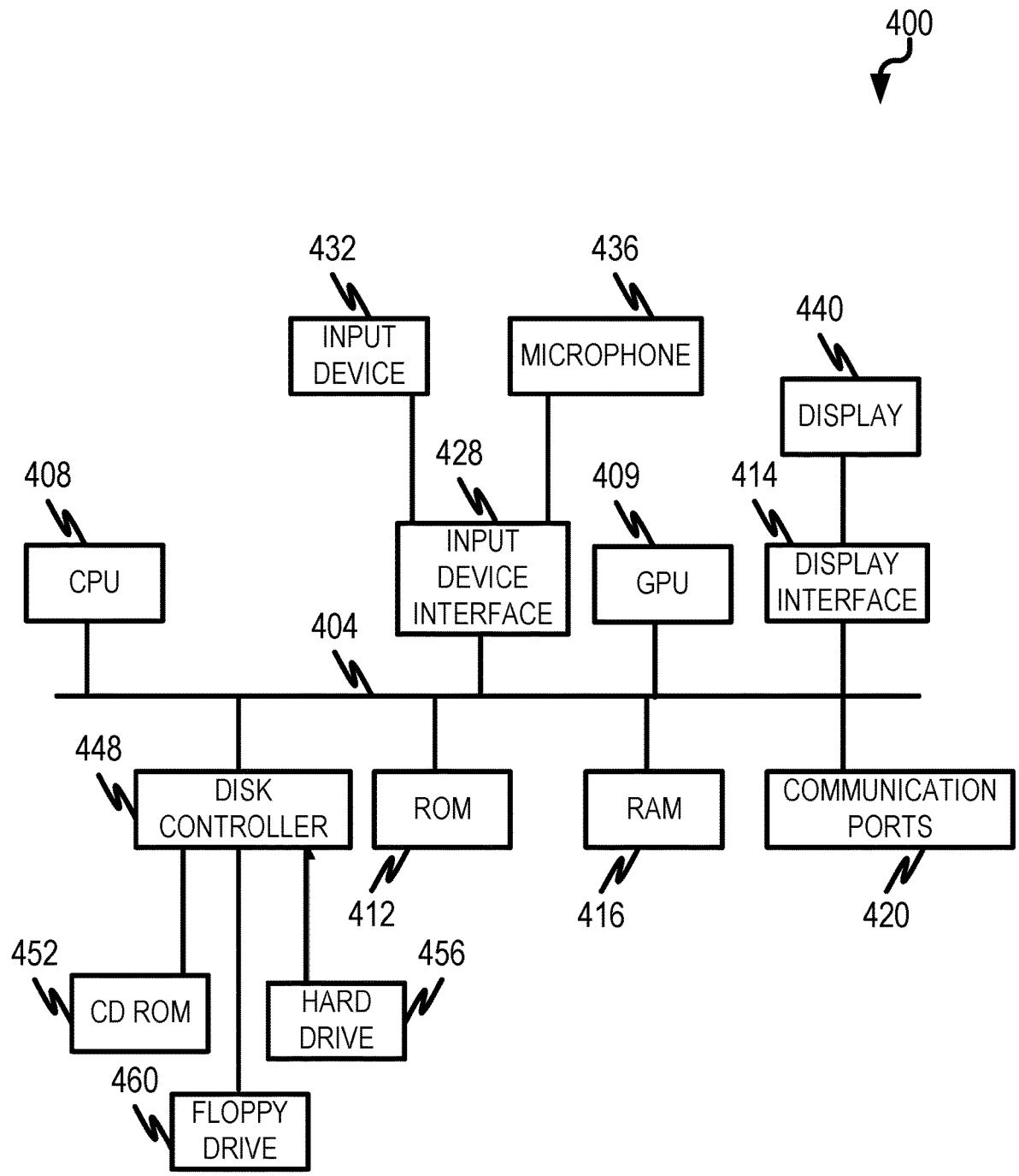
FIG. 4 is a diagram illustrating aspects of a computing device for implementing the current subject matter.

FIG. 4 is a diagram 400 illustrating a sample computing device architecture for implementing various aspects described herein. A bus 404 can serve as the information highway interconnecting the other illustrated components of the hardware. A processing system 408 labeled CPU (central processing unit) (e.g., one or more computer processors/data processors at a given computer or at multiple computers), can perform calculations and logic operations required to execute a program. A non-transitory processor-readable storage medium, such as read only memory (ROM) 412 and random access memory (RAM) 416, can be in communication with the processing system 408 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 448 can interface with one or more optional disk drives to the system bus 404. These disk drives can be external or internal floppy disk drives such as 460, external or internal CD-ROM, CD-R, CD-RW or DVD, or solid state drives such as 452, or external or internal hard drives 456. As indicated previously, these various disk drives 452, 456, 460 and disk controllers are optional devices. The system bus 404 can also include at least one communication port 420 to allow for communication with external devices either physically connected to the computing system or available externally through a wired or wireless network. In some cases, the at least one communication port 420 includes or otherwise comprises a network interface.

To provide for interaction with a user, the subject matter described herein can be implemented on a computing device having a display device 440 (e.g., a CRT (cathode ray tube) or LCD (liquid crystal display) monitor) for displaying information obtained from the bus 404 via a display interface 414 to the user and an input device 432 such as keyboard and/or a pointing device (e.g., a mouse or a trackball) and/or a touchscreen by which the user can provide input to the computer. Other kinds of input devices 432 can be used to provide for interaction with a user as well; for example, feedback provided to the user can be any form of sensory feedback (e.g., visual feedback, auditory feedback by way of a microphone 436, or tactile feedback); and input from the user can be received in any form, including acoustic, speech, or tactile input. The input device 432 and the microphone 436 can be coupled to and convey information via the bus 404 by way of an input device interface 428. Other computing devices, such as dedicated servers, can omit one or more of the display 440 and display interface 414, the input device 432, the microphone 436, and input device interface 428.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
receiving an electronic audio file comprising spontaneous speech responsive to a prompt in a non-native language of a speaker;
parsing, using an automated speech recognition (ASR) system, the electronic audio file into a plurality of spoken words;
normalizing the spoken words to remove stop words and disfluencies;
determining, using at least one trained content scoring model including at least one machine learning model, an absence of pre-defined key points associated with the prompt in the normalized spoken words, the key points comprising brief descriptions of content elements comprising a plurality of words that are expected in correct answers to the prompt;
generating a list of the determined absent key points; and
causing a view in a graphical user interface to be displayed identifying the list of absent key points and providing feedback to improve content completeness;
wherein features used by the at least one trained content scoring model are generated by a short response content scoring engine in combination with a model using word-embedding based content features.

2. The method of claim 1, wherein the determining comprises:
segmenting the normalized spoken words into a sequence of word n-grams with overlaps between two consecutive n-grams;
calculating, for each n-gram, a similarity with each of the pre-defined key points.

3. The method of claim 2, wherein the similarity is calculated using a word-mover's distance measure.

4. The method of claim 3, wherein the similarity is further calculated using a weighted word embedding measure.

5. The method of claim 4, wherein the similarity is further calculated using a query-document similarity measure.

6. The method of claim 5 comprising:
generating response-level features by selecting minimum and maximum values obtained as part of the similarity calculation among all n-grams in the normalized spoken words.

7. The method of claim 6 further comprising:
training a machine learning model for each key point based on at least a portion of the response-level features, wherein the trained machine learning models form part of the trained scoring content model.

8. The method of claim 7, wherein the trained machine learning models are random forest models.

9. The method of claim 1, wherein the trained scoring content model comprises a random forest model.

10. The method of claim 1, wherein the trained scoring content model comprises a plurality of support vector regressors trained for each of the key points.

11. A system comprising:
at least one data processor; and
memory including instructions which, when executed by the at least one data processor, result in operations comprising:
receiving an electronic audio file comprising spontaneous speech responsive to a prompt in a non-native language of a speaker;
parsing using an automated speech recognition (ASR) system, the electronic audio file into a plurality of spoken words;
normalizing the spoken words to remove stop words and disfluencies;
determining, using at least one trained content scoring model including at least one machine learning model, an absence of pre-defined key points associated with the prompt in the normalized spoken words, the key points comprising brief descriptions of content elements comprising a plurality of words that are expected in correct answers to the prompt;
generating a list of the determined absent key points; and
causing a view in a graphical user interface to be displayed identifying the list of absent key points and providing feedback to improve content completeness
wherein features used by the at least one trained content scoring model are generated by a short response content scoring engine in combination with a model using word-embedding based content features.

12. The system of claim 11, wherein the determining comprises:
segmenting the normalized spoken words into a sequence of word n-grams with overlaps between two consecutive n-grams;
calculating, for each n-gram, a similarity with each of the pre-defined key points.

13. The system of claim 12, wherein the similarity is calculated using a word-mover's distance measure.

14. The system of claim 13, wherein the similarity is calculated using a weighted word embedding measure.

15. The system of claim 14, wherein the similarity is calculated using a query-document similarity measure.

16. The system of claim 15, wherein the operations further comprise:
generating response-level features by selecting minimum and maximum values obtained as part of the similarity calculation among all n-grams in the normalized spoken words; and
training a machine learning model for each key point based on at least a portion of the response-level features, wherein the trained machine learning models form part of the trained scoring content model;
wherein the trained machine learning models are random forest models.

17. The system of claim 11, wherein the trained scoring content model comprises at least one of: a random forest model or a plurality of support vector regressors trained for each of the key points.

18. A method execution by at least one computing device comprising:
receiving an electronic audio file comprising spontaneous speech responsive to a prompt in a non-native language of a speaker;

parsing, using an automated speech recognition (ASR) system, the electronic audio file into a plurality of spoken words;
normalizing the spoken words to remove stop words and disfluencies;
determining, using at least one trained content scoring model, an absence of pre-defined key points associated with the prompt in the normalized spoken words, the key points each comprising a single complete sentence that is expected in correct answers to the prompt, the trained content scoring model comprising a random forest model trained for each of the pre-defined key points using response-level features;
generating a list of the determined absent key points; and
causing a view in a graphical user interface to be displayed identifying the list of absent key points and providing feedback to improve content completeness, the feedback including source materials associated with the absent key points, the response of the speaker, actional instructions for the speaker, and sample responses to the prompt;
wherein features used by the at least one trained content scoring model are generated by a short response content scoring engine in combination with a word-embedding model that calculates similarity to pre-defined key points using each of a word-mover's distance measure, a weighted word embedding measure, and a query-document similarity measure.

* * * * *